United States Patent
Kiwaki et al.

(10) Patent No.: US 8,397,773 B2
(45) Date of Patent: Mar. 19, 2013

(54) TIRE WITH TREAD HAVING CIRCUMFERENTIAL GROOVES, FIRST RESONATORS AND SECOND RESONATORS

(75) Inventors: Yukihiro Kiwaki, Higashimurayama (JP); Takaaki Kojima, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/375,101

(22) PCT Filed: Nov. 25, 2009

(86) PCT No.: PCT/JP2009/006362
§ 371 (c)(1),
(2), (4) Date: Jan. 31, 2012

(87) PCT Pub. No.: WO2010/137089
PCT Pub. Date: Dec. 2, 2010

(65) Prior Publication Data
US 2012/0118460 A1 May 17, 2012

(30) Foreign Application Priority Data
May 29, 2009 (JP) .................................. 2009-131626

(51) Int. Cl.
*B60C 11/04* (2006.01)
*B60C 11/13* (2006.01)

(52) U.S. Cl. ........... 152/209.8; 152/209.15; 152/209.21; 152/901; 152/DIG. 3

(58) Field of Classification Search ............... 152/209.8, 152/209.9, 209.15, 209.21, 901, DIG. 3
See application file for complete search history.

(56) References Cited

U.S. PATENT DOCUMENTS

| | | | | |
|---|---|---|---|---|
| 2007/0051448 A1* | 3/2007 | Yumii | ....................... | 152/209.18 |
| 2009/0165908 A1* | 7/2009 | Takahashi et al. | ....... | 152/209.18 |
| 2009/0272474 A1* | 11/2009 | Nagai et al. | .............. | 152/209.18 |

FOREIGN PATENT DOCUMENTS

| | | | |
|---|---|---|---|
| JP | 07-076203 A | * | 3/1995 |
| JP | 2002-225511 A | | 8/2002 |
| JP | 2009-029259 A | | 8/2002 |
| JP | 2007-237816 A | | 9/2004 |
| JP | 2007-237816 A | | 9/2007 |
| JP | 2008-302898 A | | 12/2008 |
| JP | 2009-001204 A | * | 1/2009 |
| JP | 2009-029259 A | | 2/2009 |

(Continued)

OTHER PUBLICATIONS

Machine translation for Japan 2009-001204 (no date).*
Machine translation for Japan 07-076203 (no date).*
International Search Report dated Jan. 19, 2010, cited in PCT/JP2009/006362.
Japanese Office Action of JP 2009-131626 dated Jan. 19, 2010.

*Primary Examiner* — Steven D Maki
(74) *Attorney, Agent, or Firm* — Sughrue Mion, PLLC

(57) ABSTRACT

A pneumatic tire (10) provided with a rib-like land portion (110) having first resonators formed therein, and also with a rib-like land portion (210) located, when the tire is mounted on a vehicle, on the side of the tire closer to the vehicle than the rib-like land portion (110) and having second resonators formed therein. Each of the first and second resonators includes an air chamber recessed inward in the radial direction of the tire, and also includes a narrow groove communicating with the air chamber and a circumferential groove. The volume of the air chamber of the first resonator is greater than the volume of the air chamber of the second resonator.

4 Claims, 7 Drawing Sheets

FOREIGN PATENT DOCUMENTS

| | | |
|---|---|---|
| JP | 4394161 B1 | 1/2010 |
| WO | WO-2007/072824 A1 * | 6/2007 |
| WO | WO 2007/072824 A1 | 6/2007 |
| WO | WO-2007/114430 A1 * | 10/2007 |

* cited by examiner (a)

(b)

TIRE WITH TREAD HAVING CIRCUMFERENTIAL GROOVES, FIRST RESONATORS AND SECOND RESONATORS

CROSS REFERENCE TO RELATED APPLICATIONS

This application is a National Stage of International Application No. PCT/JP2009/006362 filed Nov. 25, 2009, claiming priority based on Japanese Patent Application No. 2009-131626 filed May 29, 2009, the contents of all of which are incorporated herein by reference in their entirety.

TECHNICAL FIELD

The present invention relates to a tire with a rib-shaped land portion divided by circumferential grooves extending along a tire circumferential direction, and in particular, relates to a tire provided with a Helmholtz type resonator on a rib-shaped land portion.

BACKGROUND ART

Conventionally, tires installed in passenger vehicles implement various methods to reduce the air column resonance resulting from the space formed by the circumferential grooves extending along the tire circumferential direction and the road surface. For example, known are tires provided with the air chamber forming a constant space by means of the tread making contact with the road surface and extending along the tire circumferential direction, and side branch type resonators communicating to the air chamber and the circumferential direction grooves and including lateral grooves extending along the tread width direction on the rib-shaped land portion extending along the tire circumferential direction (for example, Patent Document 1).

PRIOR ART DOCUMENT

Patent Document

Patent Document 1: JP-A-2008-302898 (pages 3 to 4, FIG. 1)

SUMMARY OF THE INVENTION

In passenger vehicles of recent years, the demands for the reduction of tire noise have been increasing more and more compared to the past along with the improved reduction of vehicle noise (such as wind sounds and mechanical sounds) and further consideration of the environment.

Noises outside a vehicle which is one of different types of the tire noises include pass-by noises caused by air column resonance. In addition, noises inside a vehicle include, for example, road noises transmitted inside a vehicle by being transmitted through the suspension and the body. The noises outside a vehicle have a peak noise level of approximately 1 kHz and the noises inside a vehicle generally have a peak of frequency lower than the noises outside a vehicle. In other words, even if the noises outside a vehicle could be effectively reduced when the above-mentioned tires equipped with side branch type resonator are provided, there was still room for an improvement in reducing the noises inside a vehicle.

Thereupon, an object of the present invention is to provide a tire that has a high dimensionality of coexistence of reducing the different types of noises outside a vehicle such as pass-by noises caused by air column resonance as well as reducing different types of noises inside a vehicle such as road noise using resonators which have air chambers forming a constant space by means of making contact with the road surface.

To solve the above problems, the present invention has following features. First, a first feature of the present invention is summarized as a tire (pneumatic tire 10) comprising: a plurality of rib-shaped land portions (rib-shaped land portions 110, 210, 240) divided by a plurality of circumferential grooves (circumferential grooves 11, 12, 21, 22) extending along a tire circumferential direction (direction D1); and a resonator recessed toward the inside in a tire radial direction which forms a predetermined space by the rib-shaped land portion grounded to a road surface (road surface RS), wherein the resonator comprises at least: a first resonator (Helmholtz type resonator R1); and a second resonator (Helmholtz type resonator R2) positioned inside the first resonator when installed on a vehicle, the plurality of rib-shaped land portions comprise: a first rib-shaped land portion (rib-shaped land portion 110) provided with a plurality of first resonators; and a second rib-shaped land portion (rib-shaped land portion 210) separated from the first rib-shaped land portion, which is positioned inside the first rib-shaped land portion when installed on a vehicle, and which is provided with a plurality of second resonators, the first resonator and the second resonator comprise: an air chamber (air chamber 130A) recessed toward the inside in a tire radial direction; and a constriction groove (constriction groove 121, for example) communicating to the air chamber and the circumferential groove, wherein the volume of the space formed by the constriction groove and the road surface being smaller than the volume of the space formed by the air chamber and the road surface, one end of the constriction groove communicating to a closed space formed by the air chamber and the road surface along with the other end of the constriction groove communicating to at least one of the circumferential grooves from among a plurality of circumferential grooves, and a volume of the air chamber of the first resonator is greater than a volume of the air chamber of the second resonator.

A second feature of the present invention according to the first feature is summarized as that in a state where a normal load is applied to the tire, the total volume obtained by totaling the volume of the air chamber of the first resonator positioned within the grounding surface (grounding surface G) grounding with the road surface is larger than the total volume obtained by totaling the volume of the air chamber of the second resonator positioned within the grounding surface.

A third feature of the present invention according to the first or second feature is summarized as that a width (width W1) along the tread width direction of the first rib-shaped land portion is wider than a width (width W2) along the tread width direction of the second rib-shaped land portion.

A fourth feature of the present invention according to the third feature is summarized as that a plurality of first resonators are provided along the tread width direction in the first rib-shaped land portion.

A fifth feature of the present invention according to the first to fourth features is summarized as that the first rib-shaped land portion is provided outside the tire center line when installed on a vehicle, and the second rib-shaped land portion is provided inside the tire center line when installed on a vehicle.

A sixth feature of the present invention according to the first to fifth features is summarized as that the number of the second resonators is greater than the number of the first resonators.

A seventh feature of the present invention according to the first to sixth features is summarized as that the first resonator and the second resonator are Helmholtz type resonators.

According to the characteristics of the present invention, it is possible to provide a tire that has a high dimensionality of coexistence of reducing the different types of noises outside a vehicle such as pass-by noises caused by air column resonance as well as reducing different types of noises inside a vehicle such as road noise using resonators which have air chambers forming a constant space by means of making contact with the road surface.

BEST MODES FOR CARRYING OUT THE INVENTION

Figure 1:
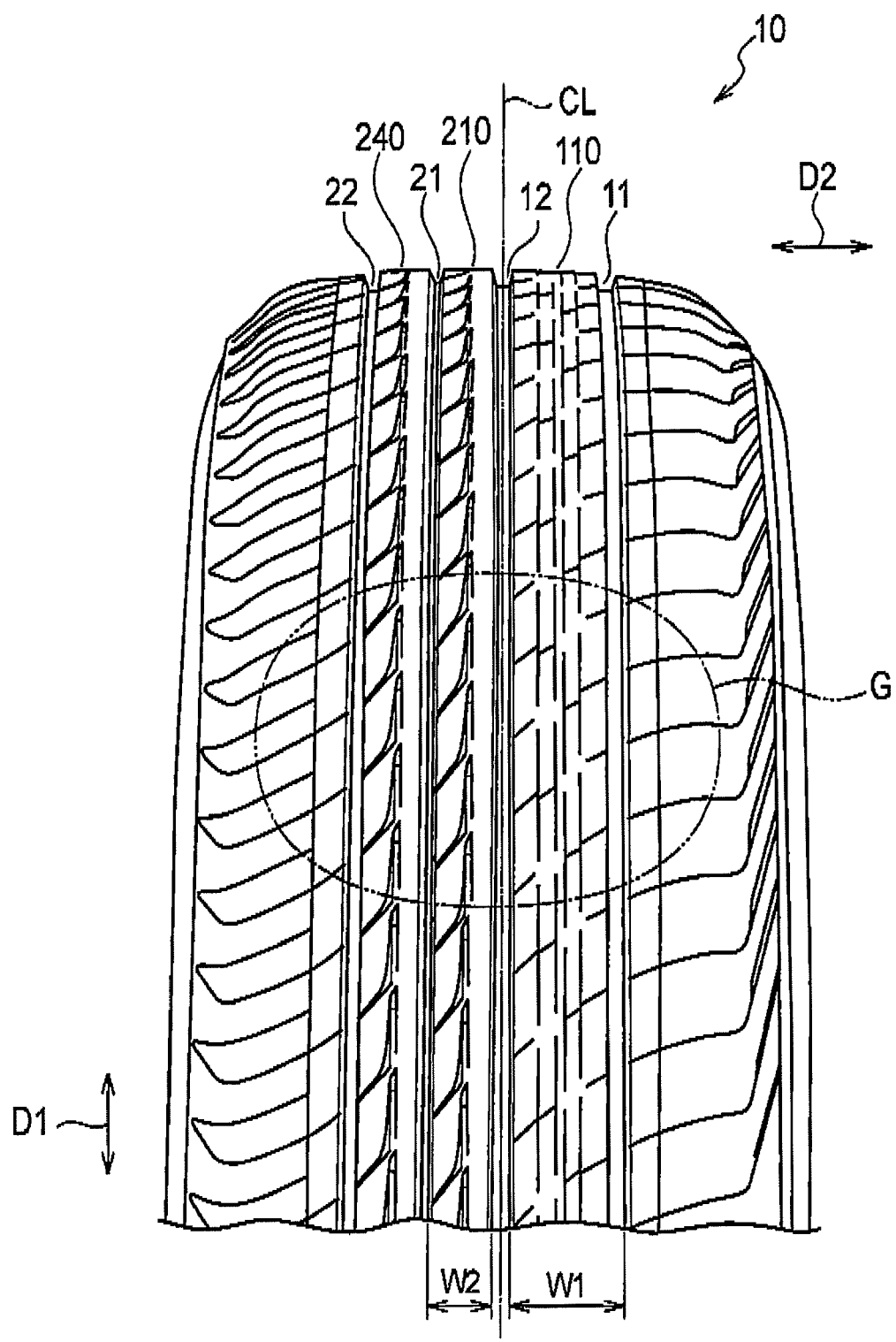
FIG. 1 is a partial front view of a pneumatic tire 10 according to an embodiment of the present invention.

Next, an embodiment of the tire related to the present invention will be described referring to the drawings. Specifically, (1) Overall tire outline composition, (2) Shape of the rib-shaped land portion, (3) Comparative evaluation, (4) Operation and Effect, and (5) Other embodiments will be described.

In the following description of the drawings, the same or like constituent elements are designated by the same or like reference numerals. However, it should be kept in mind that the drawings are merely provided as schematic ones, and that each of the ratios of dimensions or the like is different from actual ones.

Therefore, specific dimensions or the like should be determined in consideration of the following description. In addition, it is a matter of course that, among the drawings as well, units of which interrelationships of dimensions or ratios are different from each other are included.

(1) Overall Tire Outline Composition

FIG. 1 is a partial front view of a pneumatic tire 10. A plurality of circumferential grooves are provided on the pneumatic tire 10. In addition, the pneumatic tire 10 is provided with a plurality of rib-shaped land portions divided by the circumferential grooves and extending along the tire circumferential direction (direction D1 of FIG. 1). The pneumatic tire 10 is a tire manufactured taking into consideration of the reduction of tire noise such as air column resonance and is installed on passenger vehicles which require a high degree of quietness. Furthermore, the pneumatic tire 10 can be filled up with inert gas, such as nitrogen gas, instead of air.

More specifically, circumferential grooves 11, 12, 21, and 22 are provided on the pneumatic tire 10. The circumferential grooves 11, 12, 21, and 22 extend along the tire circumferential direction.

A rib-shaped land portion 110 is provided between the circumferential groove 111 and the circumferential groove 112. Namely, the rib-shaped land portion 110 is adjacent to the circumferential groove 111 and the circumferential groove 112 and extends along the tire circumferential direction.

A rib-shaped land portion 210 is provided between the circumferential groove 112 and the circumferential groove 121. A rib-shaped land portion 240 is provided between the circumferential groove 121 and the circumferential groove 122. The rib-shaped land portion 210 and the rib-shaped land portion 240 as well as the rib-shaped land portion 110 extend along the tire circumferential direction.

In other words, the plurality of rib-shaped land portions (rib-shaped land portions 110, 210, and 240) divided by the plurality of circumferential grooves (circumferential grooves 11, 12, 21, and 22) are provided on the pneumatic tire 10.

An air chamber 130A and an air chamber 130B (refer to FIG. 2) which repeat at predetermined pitches along the tire circumferential direction with the recessed portion recessed toward the inside in the tire radial direction are provided on the rib-shaped land portion 110. A plurality of air chambers 220 (refer to FIG. 5) are provided on the rib-shaped land portion 210 along the tire circumferential direction. Similarly, a plurality of air chambers 250 (refer to FIG. 5) are provided on the rib-shaped land portion 240 along the tire circumferential direction. In this embodiment, the rib-shaped land portion 110 configures a fast rib-shaped land portion and the rib-shaped land portion 210 and the rib-shaped land portion 240 configure a second rib-shaped land portion.

In this embodiment, the rib-shaped land portion 110 is provided outside the tire center line CL when installed on a vehicle. The rib-shaped land portion 210 and the rib-shaped land portion 240 are provided inside the tire center line CL when installed on a vehicle. The rib-shaped land portion 210 does not always need to be provided inside the tire center line CL when installed on a vehicle.

As described later, a constriction groove whose groove width is approximately several mm (millimeters) communicates to each of the air chambers. The air chamber and the constriction groove are recessed toward the inside in the tire radial direction and when the rib-shaped land portion grounds with the road surface RS, they shape a predetermined space. A Helmholtz type resonator is configured by this air chamber and the constriction groove.

(2) Shape of the Rib-Shaped Land Portion

Next, the shape of the rib-shaped land portion will be described. More specifically, the shape of the rib-shaped land portion 110 and the rib-shaped land portions 210 and 240 will be described.

(2.1) Rib-Shaped Land Portion 110

Figure 2:
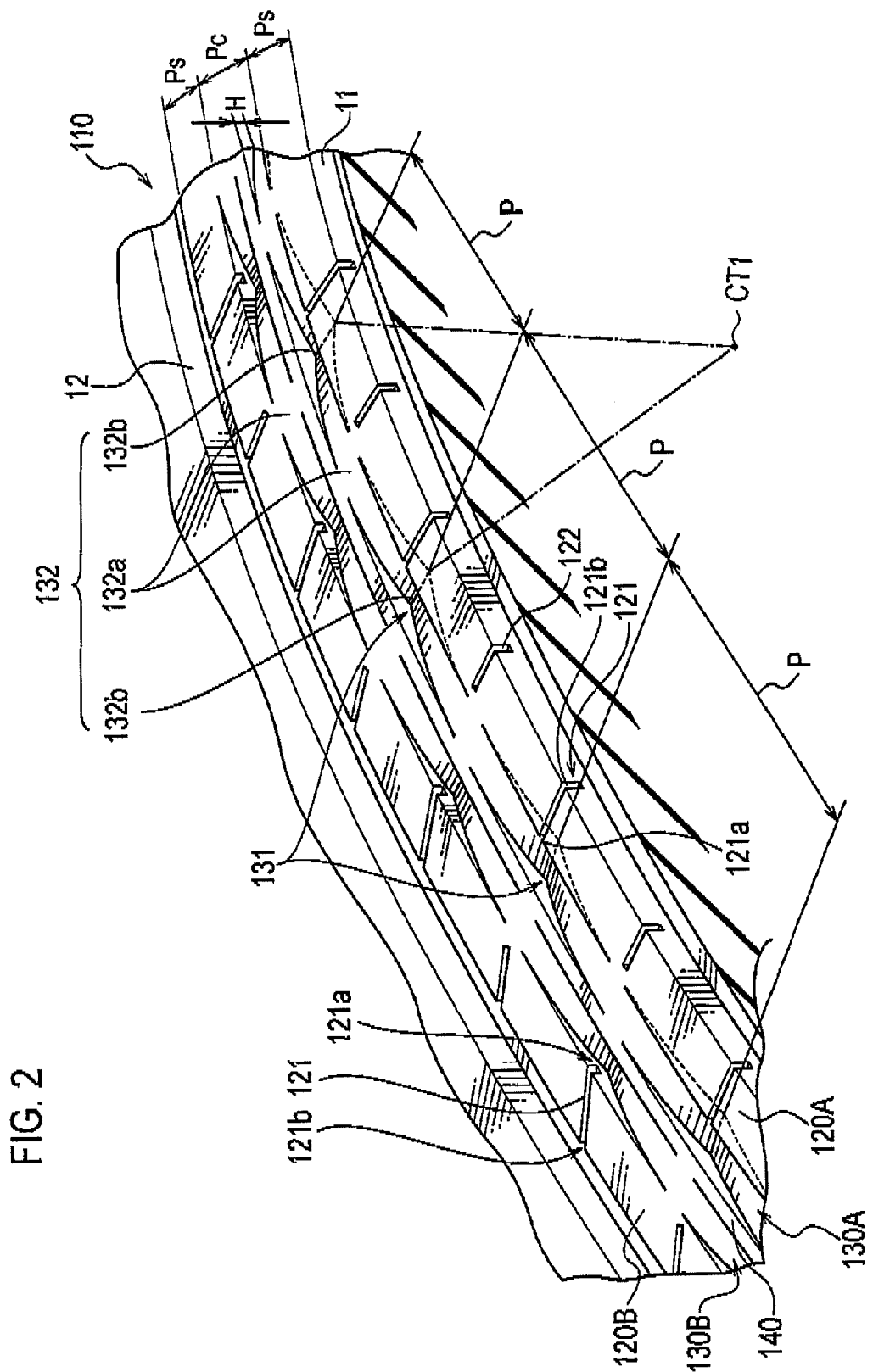
FIG. 2 is a partial perspective view of a rib-shaped land portion 110 according to an embodiment of the present invention.

FIG. 2 is a partial perspective view of the rib-shaped land portion 110. As shown in FIG. 2, the rib-shaped land portion 110 has a land portion 120A, a land portion 120B, and a land portion 140. The land portion 120A, the land portion 120B, and the land portion 140 are grounded with the road surface RS (not shown in FIG. 2, refer to FIG. 3), by means of the rolling motion of the pneumatic tire 10. In other words, the land portion 120A, the land portion 120B, and the land portion 140 configure a grounding surface of the pneumatic tire 10 grounding with the road surface RS.

The land portion 120A and the land portion 120B are provided on both ends in the tread width direction (direction D2 of FIG. 1) of the rib-shaped land portion 110. The land portion 120A is adjacent to the circumferential groove 111. The land portion 120B is adjacent to circumferential groove 112.

The air chamber 130A and the air chamber 130B are provided on the rib-shaped land portion 110. The air chamber 130A is provided between the land portion 120A and the land portion 140. The recessed portion 131 is formed recessed toward the inside in the tire radial direction on the air chamber 130A. The recessed portion 131 is repeated at pitches of P (predetermined pitches) along the tire circumferential direction.

Although the air chamber 130A and the air chamber 130B are provided on the same rib-shaped land portion (rib-shaped land portion 110), the air chamber 130B is provided at a position different from the air chamber 130A in a tread width direction (direction D2 of the FIG. 1). More specifically, the air chamber 130B is provided between the land portion 120B and the land portion 140. The shape of the air chamber 130B is identical to that of the air chamber 130A. Namely, for the air chamber 130A and the air chamber 130B, the recessed portion 131 is repeated at pitches of P.

Since the shapes of the air chamber 130A and the air chamber 130B are identical, the shape of the air chamber 130A will be mainly described hereinafter. As shown in FIG. 2, the bottom surface 132 of the air chamber 130A is formed by repeating an arch shape forming a circular arc in the cross sectional view along the tire circumferential direction. In other words, the height H from the bottom surface 132 of the air chamber 130A up to the grounding surface (for example, the surface of the land portion 120A grounded with the road surface RS) changes along the tire circumferential direction. The middle CT1 of the circular arc of the bottom surface 132 is positioned on the inner side of the tire radial direction than the bottom surface 132.

The bottom surface 132 makes contact with the road surface RS at the highest position 132a where the height up to the grounding surface is highest. More specifically, the bottom surface 132 makes a line contact with the road surface RS along a direction different from the tire circumferential direction. In other words, the bottom surface 132 has a shape such that the width along the tire circumferential direction of the bottom surface 132 contact with the road surface RS becomes as narrow as possible.

Although the shape of the bottom surface of the of the air chamber 130B is identical to the shape of the bottom surface 132, there is a half phase shift of the pitch F in the tire circumferential direction between the highest position 132a of the bottom surface 132 of the air chamber 130A and the highest position 132a of the bottom surface of the air chamber 130B.

A constriction groove 121 and a narrow groove 122 are formed in the land portion 120A. The constriction groove 121 and the narrow groove 122 are narrow grooves whose groove widths are approximately several mm (millimeters). The constriction groove 121 communicates to the recessed portion 131. The volume of the space formed by the constriction groove 121 and road surface RS has a volume smaller than the space formed of the recessed portion 131 and the road surface.

Figure 3:
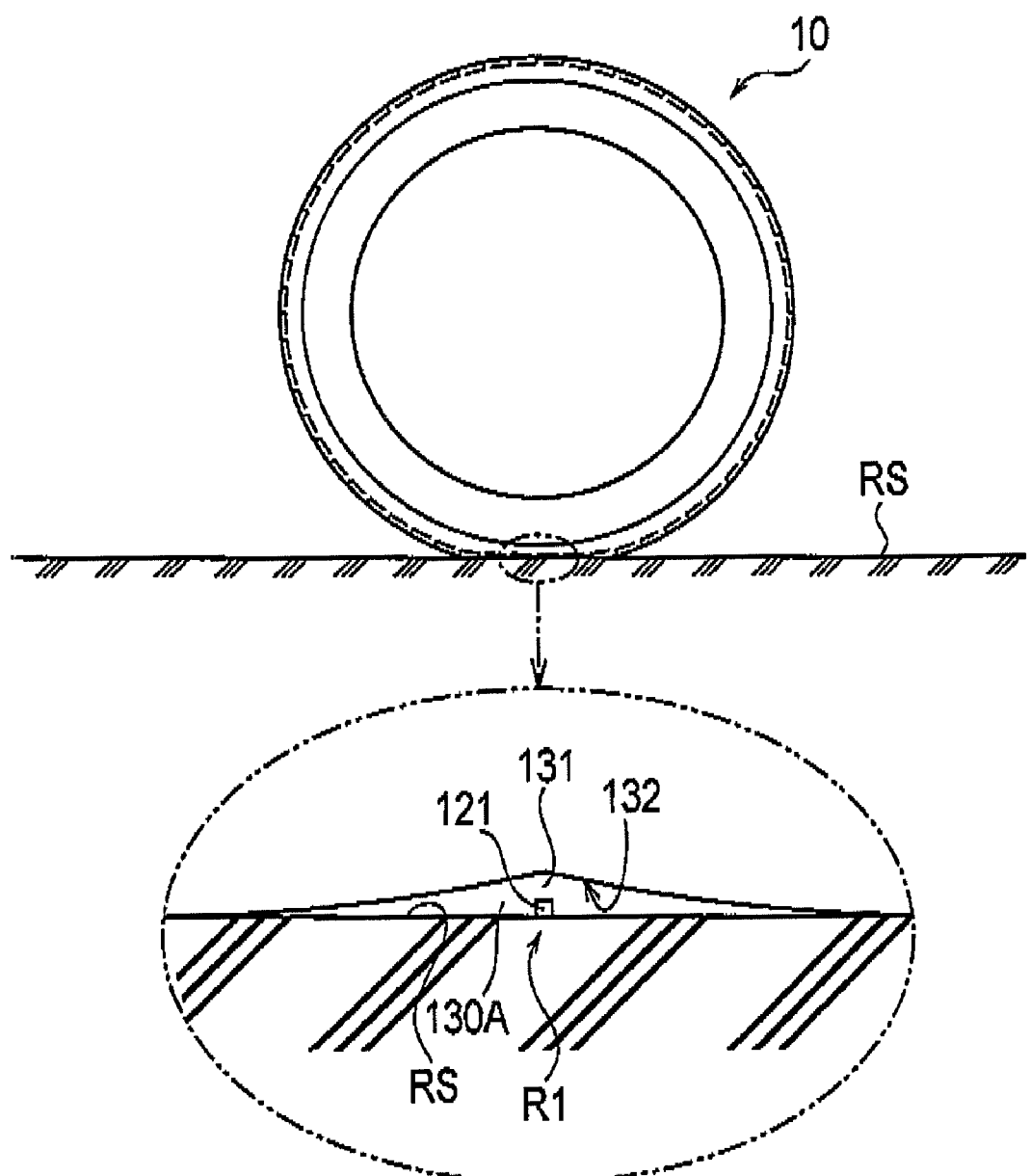
FIG. 3 shows the shape of a Helmholtz type resonator R1 viewed in the tread width direction according to an embodiment of the present invention.
Figure 4:
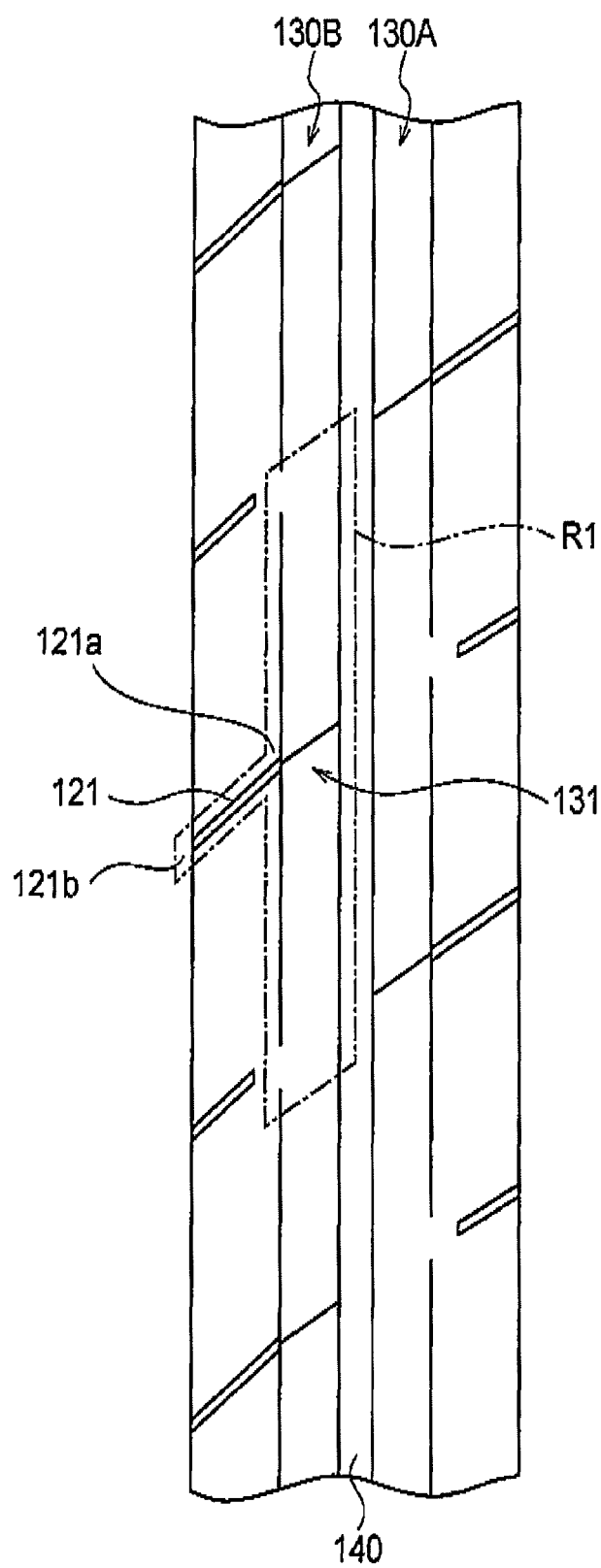
FIG. 4 shows the shape of a Helmholtz type resonator R1 viewed in a tread plane according to an embodiment of the present invention.

FIG. 3 and FIG. 4 show the shape of the Helmholtz type resonator R1 formed by the pneumatic tire 10 and road surface RS. More specifically, FIG. 3 shows the shape of the Helmholtz type resonator R1 as viewed in the tread width direction. FIG. 4 is a diagram showing the shape of the Helmholtz type resonator R1 as viewed in a plane. As shown in FIG. 3 and FIG. 4, the constriction groove 121 and the air chamber 130A that has the recessed portion 131 configure the Helmholtz type resonator R1. In this embodiment, the Helmholtz type resonator R1 configures a first resonator. As shown in FIG. 2, a plurality of the Helmholtz type resonators R1 configured by the constriction groove 121 and the air chamber 130A are provided on rib-shaped land portion 110 along the tread width direction.

As described above, although the height H from the bottom surface 132 of the air chamber 130A up to the grounding surface changes along the tire circumferential direction, a plurality of the highest positions 132a make contact with the road surface RS repeatedly at every pitch P. Because of this, an air chamber is formed to communicate to the constriction groove 121. Namely, an air chamber is formed for the Helmholtz type resonator R1 by means of the bottom surface 132 between the two highest positions 132a being adjacent to each other and the road surface RS making contact with the land portion 120A and the land portion 140. Because a method to reduce air column resonance using the Helmholtz type resonator R1 is disclosed in the prior art documents mentioned in this specification, the description will be omitted here.

One end (end portion 121a) of the constriction groove 121 communicates to a closed space formed by the air chamber 130A and the road surface RS. More specifically, the end portion 121B communicates to a closed space formed by the recessed portion 131, the highest positions 132a formed at both ends in the tire circumferential direction of the recessed portion 131, and the road surface RS.

On the other hand, the other end (end portion 121b) of the constriction groove 121 communicates to at least one from among a plurality of circumferential grooves, specifically the circumferential groove 111. In this embodiment, the end portion 121a communicates to the recessed portion 131 at the lowest position 132b where the position of the bottom surface 132 is lowest. For this reason, the Helmholtz type resonator R1 opens at one end only and closes at the other end.

As shown in FIG. 2, the air chamber 130A comprising the Helmholtz type resonator R1 is provided on a center portion Pc in the tread width direction of the rib-shaped land portion 110. On the other hand, the constriction groove 121 configuring the Helmholtz type resonator R1 is provided on a shoulder portion Ps positioned on the shoulder side of the rib-shaped land portion 110 compared to the center portion Pc.

The narrow groove 122 communicates to the circumferential groove 111 only. In other words, the narrow groove 122 is not communicated to the recessed portion 131. For this reason, the narrow groove 122 does not serve as a component of the Helmholtz type resonator R1.

(2.2) Rib-Shaped Land Portions 210 and 240

FIG. 5(a) is a partial perspective view of the rib-shaped land portion 210 and the rib-shaped land portion 240 related to an embodiment of the present invention. FIG. 5(b) is a cross-sectional view of the air chamber 220 along line F10-F10 shown in FIG. 5(a) related to an embodiment of the present invention.

Figure 5:
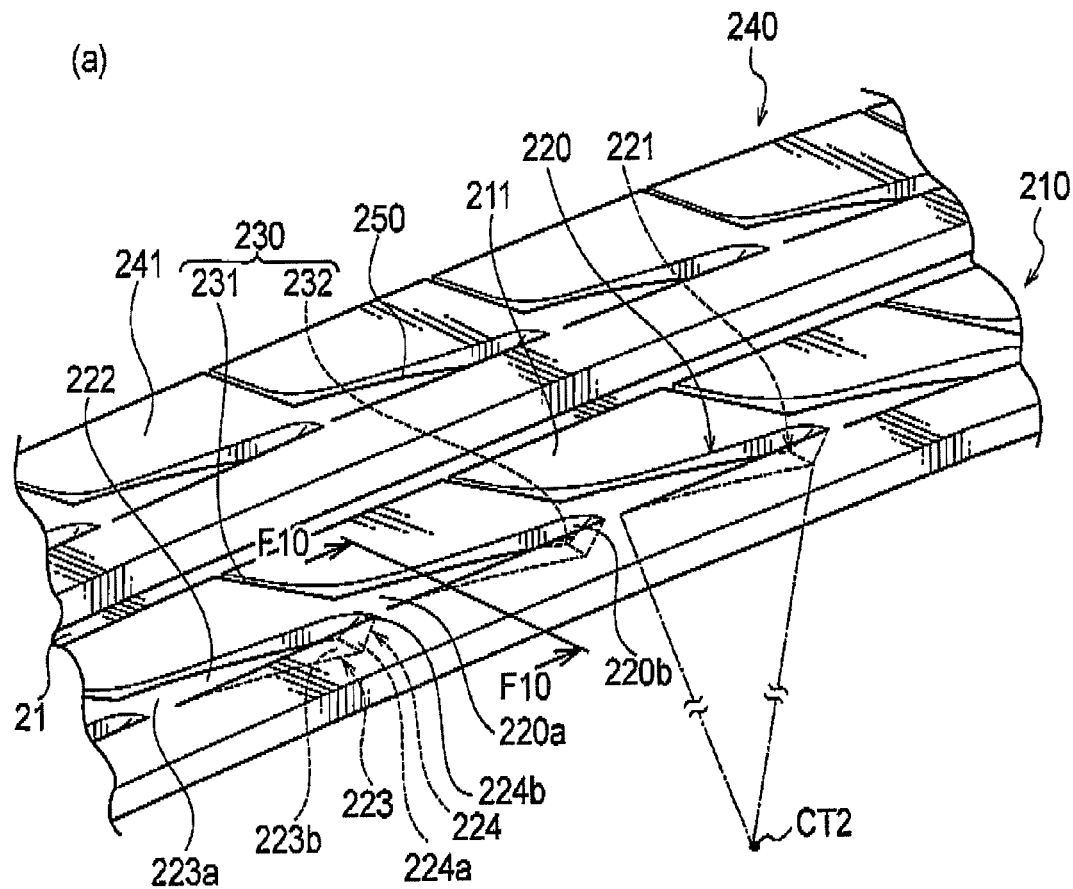
FIG. 5(a) is a partial perspective view of a rib-shaped land portion 210 and a rib-shaped land portion 240 according to an embodiment of the present invention.
FIG. 5(b) is a cross-sectional view of an air chamber 220 along line F10-F10 shown in FIG. 5(a) according to an embodiment of the present invention.
Figure 5:
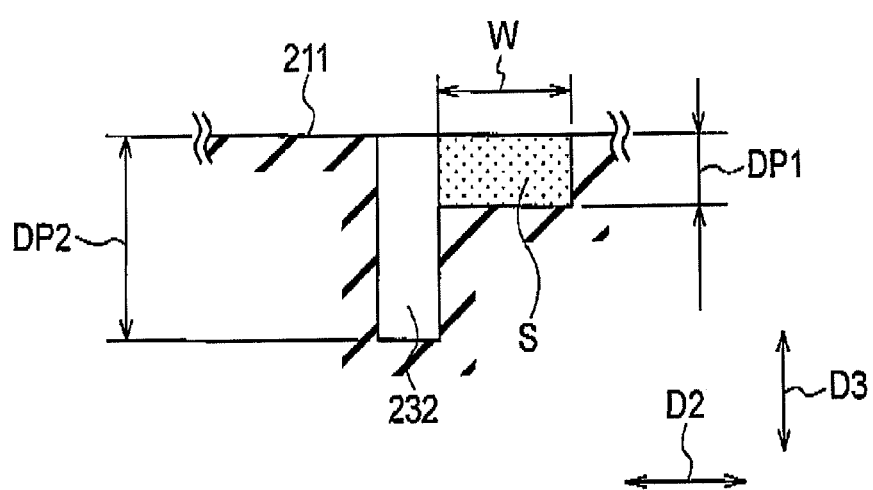

As shown in FIG. 5, a land portion 211 grounded to the road surface RS (refer to FIG. 6) and a plurality of air chambers 220 are provided on the rib-shaped land portion 210. The plurality of air chambers 220 are provided along the tire circumferential direction. The land portion 241 having an identical shape of the land portion 211 and the air chamber 250 having an identical shape of the air chamber 220 are provided on the rib-shaped land portion 240. The rib-shaped land portion 240 is provided at different positions from the rib-shaped land portion 210 in a tread width direction.

The rib-shaped land portion 210 and the rib-shaped land portion 240 are separate from the rib-shaped land portion 110 and are positioned inside the rib-shaped land portion 110 when installed on a vehicle.

Since the shapes of the rib-shaped land portion 210 and the rib-shaped land portion 240 are identical, in the following, a description of the shape of the air chamber 220 formed on the rib-shaped land portion 210 will be mainly described. As shown in FIG. 5, the air chamber 220 has the recessed portion 221 recessed toward the inside in the tire radial direction.

The depth DP1 of the recessed portion 221 based on the grounding surface where the land portion 211 is grounded with the road surface (surface of land portion 211 grounded to the road surface RS) is deeper at one end (the end portion 220b referred to FIG. 6(a)) of the air chamber 220 in the tire circumferential direction than at the other end (the end portion 220a referred to FIG. 5(a)) of the air chamber 220. The height from the bottom surface 222 of the recessed portion 221 up to the grounding surface changes along the tire circumferential direction.

The bottom surface 222 of the recessed portion 221 has a curved portion 223 in a curved line shape in the cross-sectional view along the tire circumferential direction. The middle CT2 of the circular arc along the curved portion 223 is positioned inside the bottom surface 222 in the tire radial direction, The curved portion 223 can also be configured by a plurality of circular arcs. For this case, the middle CT2 is taken as the middle of one circular arc approximated to the curved line formed by the plurality of circular arcs.

The bottom surface 222 has a linear portion 224 in a linear shape in the cross sectional view along the tire circumferential direction. The linear portion 224 is formed on the end portion 220b (refer to FIG. 5(a)) side of the air chamber 220. One end of the linear portion 224 (end portion 224a) connects to the end portion 223b of the curved portion 223 while the other end of the linear portion 224 (end portion 224b) connects to the grounding surface where the land portion 211 grounds with the road surface.

The constriction groove 1230 communicates to the air chamber 220. More specifically, one end of the constriction groove 1230 communicates to the end portion 220a of the air chamber 220 in the tire circumferential direction. In other words, the constriction groove 1230 communicates to a closed space formed by the air chamber 220 and the road surface RS. Moreover, the other end of the constriction groove 1230 specifically communicates to at least one from among a plurality of circumferential grooves, specifically the circumferential groove 121. The volume of the space formed by the constriction groove 1230 and a road surface is smaller than the volume of space formed by the recessed portion 221 and a road surface.

The constriction groove 1230 is configured by an outer groove 1231 and an inner groove 1232. The outer groove 1231 communicates to the circumferential groove 121, and extends to the end portion 220a of the air chamber 220. The inner groove 1232 communicates to the outer groove 1231, extends to the end portion 220b of the air chamber 220, and more specifically extends up to the side of the linear portion 224. In this embodiment, the inner groove 1232 configures an extended portion. The inner groove 1232 is formed between the recessed portion 221 and the grounding surface which the land portion 211 is grounded with the road surface.

As shown in FIG. 5(b), the constriction groove 1230, specifically, the depth DP2 of the inner groove 1232 is deeper than the depth DP1 of the recessed portion 221 from the grounding surface where the land portion 211 is grounded with the road surface.

Figure 6:
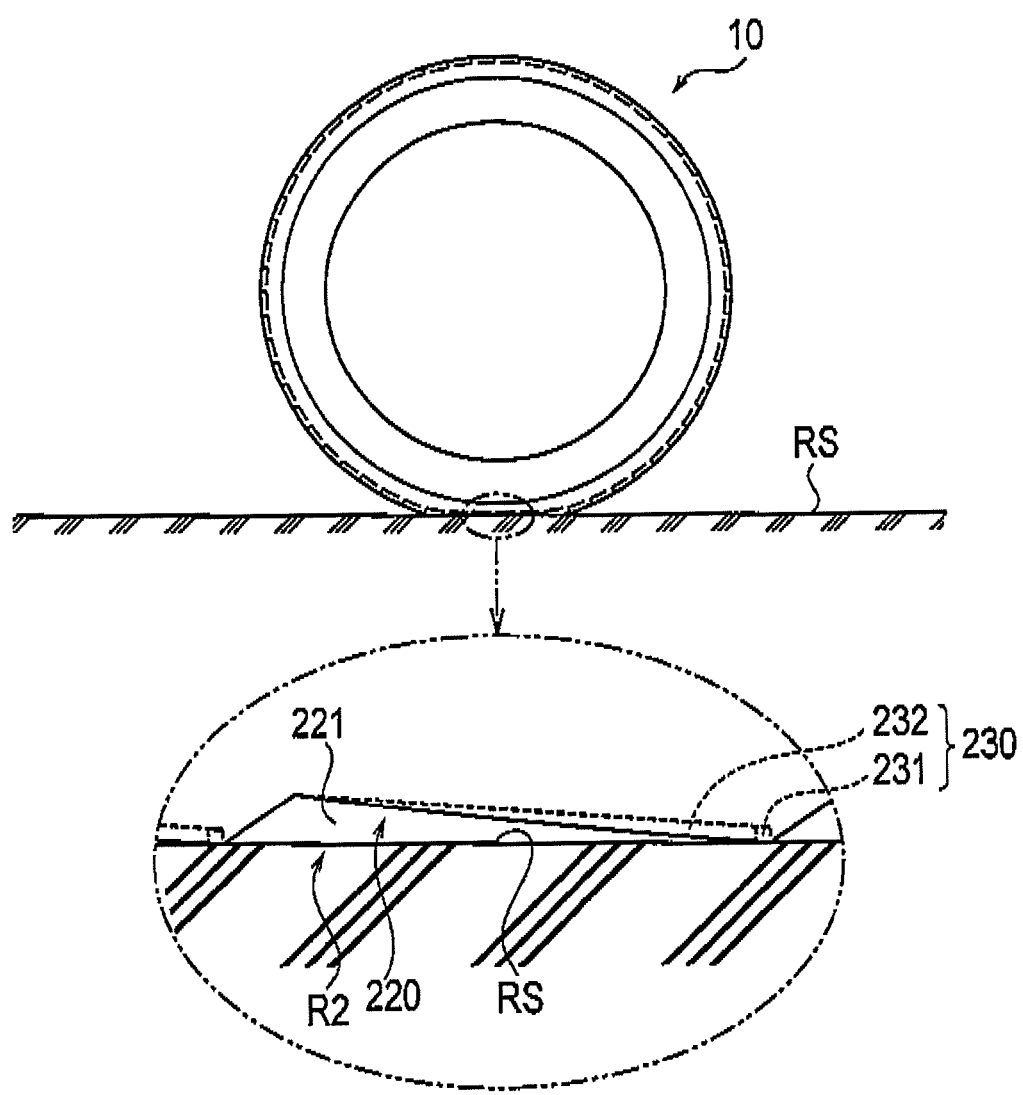
FIG. 6 shows the shape of a Helmholtz type resonator R2 viewed in the tread width direction according to an embodiment of the present invention.

FIG. 6 shows the shape of the Helmholtz type resonator R2 formed by the pneumatic tire 10 and the road surface RS. More specifically, FIG. 6 is a diagram showing the shape of the Helmholtz type resonator R2 as viewed in the tread width direction. The region enclosed by the alternating long and short dashed lines of FIG. 6 shows the shape of the Helmholtz type resonator R2 as viewed in the tread width direction.

As shown in FIG. 6, the constriction groove 1230 configured by the air chamber 220 that has the recessed portion 221, the outer groove 1231, and inner groove 1232 configures the Helmholtz type resonator R2. In this embodiment, the Helmholtz type resonator R2 configures a second resonator. A plurality of the Helmholtz type resonators R2 configured by the air chamber 220 and the constriction groove 1230 are provided on the rib-shaped land portion 210 along the tread width direction. In like manner to the Helmholtz type resonator R1, the Helmholtz type resonator R2 only opens at one end and closes at the other end.

(2.3) Comparison with the Rib-Shaped Land Portion 110 and the Rib-Shaped Land Portions 210 and 240

Compared the Helmholtz type resonator R1 (refer to FIG. 3 and FIG. 4) formed on the rib-shaped land portion 110 described above to the Helmholtz type resonator R2 formed on the rib-shaped land portion 210 (rib-shaped land portion 240), the volume of the air chamber 130A (recessed portion 131) of the Helmholtz type resonator R1 is larger than the volume of the air chamber 220 of the Helmholtz type resonator R2. Furthermore, the number of Helmholtz type resonators R2 (second resonator) is greater than the number of the Helmholtz type resonators R1 (first resonator).

As shown in FIG. 1, the width W1 along the tread width direction of the first rib-shaped land portion is wider than the width W2 along the tread width direction of the rib-shaped land portion 210 (rib-shaped land portion 240). In addition, in a state where a normal load is applied to the pneumatic tire 10, the total volume obtained by totaling the volume of the air chamber 130A of the Helmholtz type resonator R1 positioned within the grounding surface G where the road surface RS is grounded is larger than the total volume obtained by totaling the volume of the air chamber 220 of the Helmholtz type resonator R2 positioned within the grounding surface G.

Figure 7:
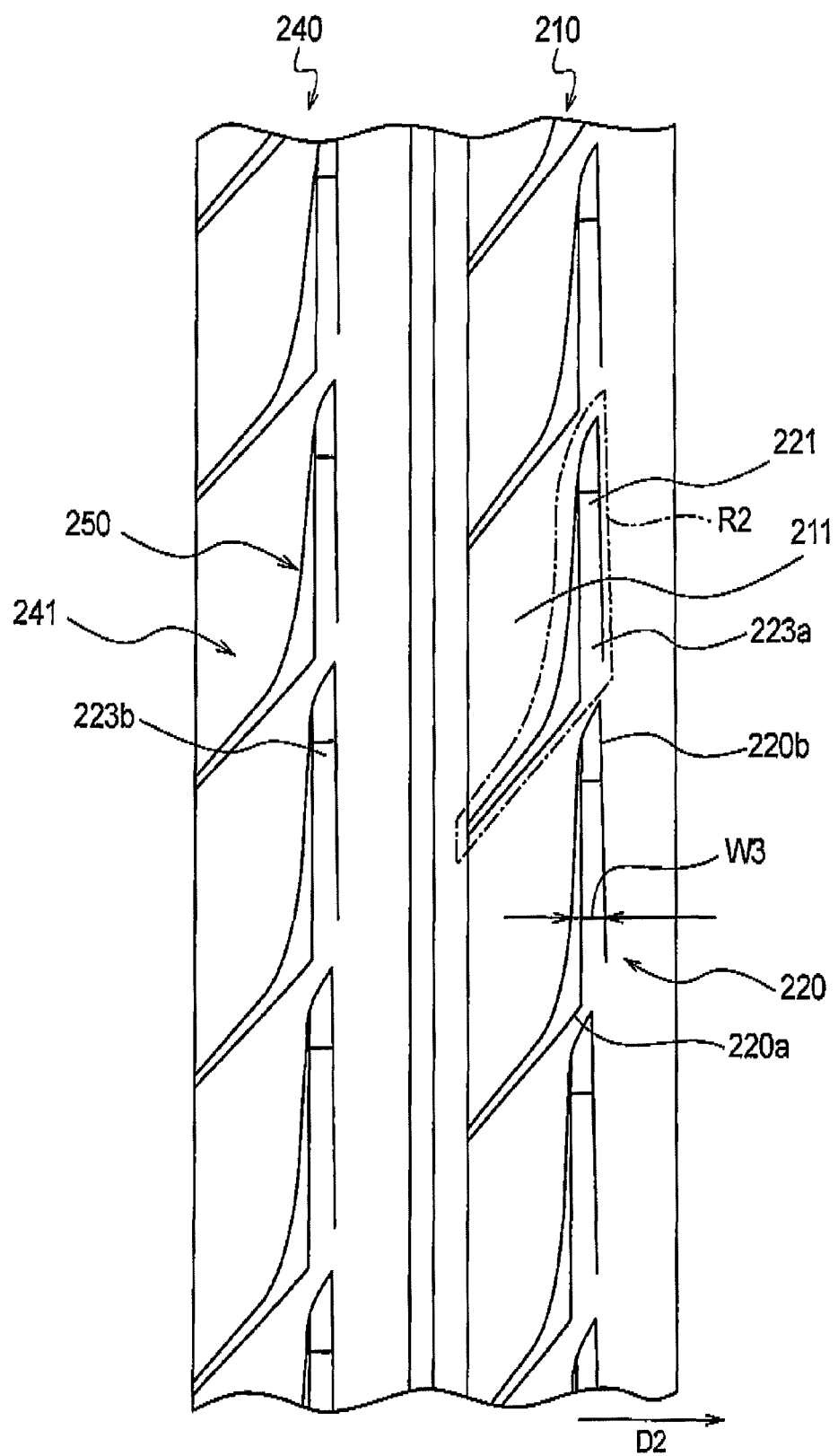
FIG. 7 is a partial enlarged plan view of a rib-shaped land portion 210 and a rib-shaped land portion 240 according to an embodiment of the present invention.

FIG. 7 is a partial enlarged plan view of the rib-shaped land portion 210 and the rib-shaped land portion 240. As shown in FIG. 7, the air chamber 220 has a tapered shape in which the width W3 in tread width direction becomes narrower in proportion to movement from the end portion 220a of the air chamber 220 toward the end portion 220b as viewed in a tread plane.

The cross-sectional area S (refer to FIG. 5(b)) along the tread width direction (direction D2) of the recessed portion 221 and the tire radial direction (direction D3 in the figure) is almost the same from one end (end portion 223a) in the tire circumferential direction of the curved portion 223 to the other end (end portion 223b).

In this embodiment, as shown in FIG. 7, the position in the tire circumferential direction of the air chamber 220 formed on the rib-shaped land portion 210 differs from the position of the air chamber 250 formed on the rib-shaped land portion 240. More specifically, the position (end portion 223b) with a deepest depth from the grounding surface (land portion 241)

of the recessed portion formed on the rib-shaped land portion 240 is almost the same as the position with the shallowest depth (end portion 223a) from the grounding surface (land portion 211) of the recessed portion 221 formed on the rib-shaped land portion 210 in the tire circumferential direction.

(3) Comparative Evaluation

Next, the test method of the comparative evaluation of the pneumatic tire 10 described above, the pneumatic tire related to an embodiment that has a substantially identical pattern, and a pneumatic tire related to a comparative example and the results will be described.

(3.1) Test Method

The noise level of the pneumatic tire applied to an embodiment and a comparative example using a test vehicle was measured. The test conditions related to the comparative evaluation are as follows.

Test vehicle: Sedan type passenger vehicle (Japanese vehicle)
Tire size used: 215155R17
Rim size used: 7J×17
Set internal pressure: 210 kPa
Set load: 4.41 kN
Travel speed: 80 km/h
Measurement method: A microphone was installed in the vehicle and the noise was measured.

(3.2) Test Result

Table 1 shows the results of the tests related to the comparative evaluation mentioned above.

TABLE 1

|  | Comparative example 1 No resonators | Comparative example 2 Air chamber total volume $C_{IN} = 1.5°$ Air chamber total volume $C_{OUT}$ | Embodiment Air chamber total volume $C_{OUT} = 1.5°$ Air chamber total volume $C_{IN}$ |
|---|---|---|---|
| Noise level index (smaller the superior) | 100 | 94 | 90 |

The comparative example 1 is a pneumatic tire not provided with the resonator. The comparative example 2 is a pneumatic tire provided with the resonator, in which the total volume ($C_{IN}$) of the air chamber positioned on the inside when installed on a vehicle with the tire center line CL as a standard is set up by 1.5 times the total volume ($C_{OUT}$) of the air chamber positioned on the outside when installed on a vehicle. The embodiment is a pneumatic tire in which the total volume ($C_{OUT}$) of the air chamber positioned on the outside when installed on a vehicle with the tire center line CL as a standard is set up by 1.5 times the total volume ($C_{IN}$) of the air chamber positioned on the inside when installed on a vehicle.

As shown in Table 1, although the noise level falls by providing a resonator, in particular, the pneumatic tire related to this embodiment, the noise level improved 10% for the comparative example 1 (with no resonator) while the noise level improved approximately 4.3% for the comparative example 2 ($C_{IN} > C_{OUT}$).

(4) Operation and Effect

According to the pneumatic tire 10 mentioned above, the volume ($C_{OUT}$) of the air chamber of the Helmholtz type resonator R1 positioned on the outside when installed on a vehicle is greater than the volume ($C_{IN}$) of the air chamber of the Helmholtz type resonator R2 positioned on the inside when installed on a vehicle. More specifically, the total volume of the air chamber of the Helmholtz type resonator R1 positioned within the grounding surface G grounding with the road surface RS is larger than the total volume of the air chamber of the Helmholtz type resonator R2 positioned within the grounding surface G.

For this reason, it is possible to reduce noises outside a vehicle, such as a pass-by noise, easily transmitted from the vehicles equipped with the pneumatic tire 10 toward the outside. At the position on the inside when installed on a vehicle, because a plurality of Helmholtz type resonators R2 with a small volume of the air chambers are provided along the tire circumferential direction, the block hardness of the rib-shaped land portion 210 (rib-shaped land portion 240) falls allowing road noises transmitted inside a vehicle by being transmitted into the vehicle such as a suspension and a body, to be reduced as well. In particular, since road noise is easily transmitted to the position on the inside, near the suspension and the wheel axis, when the pneumatic tire 10 installed on a vehicle, road noises occurring from the applicable areas can be effectively controlled by means of providing the Helmholtz type resonator R2 with a small volume of the air chamber at the position on the inside when installed on a vehicle.

Moreover, since a Helmholtz type resonator whose entire size is easy to reduce compared with a side branch type resonator, the block hardness of the rib-shaped land portion can be suitably reduced as well as contributing to the reduction of the road noise.

In other words, according to the pneumatic tire 10, a high dimensionality of coexistence of reducing the different types of noises outside a vehicle such as pass-by noises caused by air column resonance as well as reducing different types of noises inside a vehicle such as road noise is possible.

In this embodiment, the width W1 along the tread width direction of the rib-shaped land portion 110 is wider than the width W2 along the tread width direction of the rib-shaped land portion 210 (rib-shaped land portion 240). For this reason, more Helmholtz type resonators are provided on the rib-shaped land portion 110 positioned on the outside when installed on a vehicle and with a significant effect on the noise outside a vehicle to further reduce the noise outside a vehicle.

In this embodiment, the air chamber 130A is provided at the center portion Pc of the rib-shaped land portion 110, and the constriction groove 121 is provided on the shoulder portion Ps positioned at the shoulder side of the rib-shaped land portion 110 compared to the center portion Pc. For this reason, by means of installing the constriction groove 121 with a small volume in a shoulder portion, a constant block hardness required for the rib-shaped land portion 110 can be ensured and the noise outside a vehicle can be effectively reduced.

(5) Other Embodiments

As described previously, while the contents of the present invention are disclosed through the embodiments of the present invention, it should not be understood that the discussion and drawings which form a part of this disclosure limit the present invention. From this disclosure, a variety of alternative embodiments, examples, and operational techniques would become self-evident to one skilled in the art.

For example, the shape of the Helmholtz type resonator cannot be limited to the Helmholtz type resonator R1 or the Helmholtz type resonator R2 which are described above, different shapes can be used, and be shapes other than those of the Helmholtz type resonator R1 or the Helmholtz type resonator R2.

Even further, from among the Helmholtz type resonator R1 and the Helmholtz type resonator R2, the Helmholtz type resonator R1 positioned on the outside when installed on a vehicle can also use not only a Helmholtz type resonator but also a side branch type resonator.

In the embodiment described above, although the circumferential grooves 11, 12, 21, and 22 are extended in a linear shape along the tire circumferential direction, as long as the circumferential grooves extend along the tire circumferential direction, there is no limitation on a linear shape and a staggered shape or a corrugated shape can also be used.

Thus, it is needless to say that various embodiments which not been disclosed here are also included in the present invention. Therefore, the technical scope of the present invention is only stipulated by the invention characteristics related to the appropriate claims from above-mentioned description.

The entire contents of Japanese Patent Application No. JP 2009-131626A (filed on May 29, 2009) is incorporated into this specification by reference.

INDUSTRIAL APPLICABILITY

As described hereinbefore, the tire according to the present invention uses a resonator which has air chambers forming constant spaces by making contact with the road surface to make it possible to reduce the noise outside a vehicle such as pass-by noises caused by air column resonance and also reduce the noise inside a vehicle such as road noises by allowing a high dimensionality of coexistence. Therefore, the present invention is useful in the field of manufacturing a tire.

REFERENCE NUMERAL 10,10A,10B . . . pneumatic tire, 11,12,21,22 . . . circumferential grooves, 110 . . . rib-shaped land portion, 120A, 120B . . . land portion, 121 . . . constriction groove, 121$a$, 121$b$ . . . end portion, 122 . . . narrow groove, 130A-130H . . . air chambers, 131 . . . recessed portion, 132 . . . bottom surface, 132$a$ . . . highest portion, 132$b$ . . . lowest portion, 140 . . . land portion, 210 . . . rib-shaped land portion, 211 . . . land portion, 220 . . . air chamber, 240 . . . rib-shaped land portion, 220$a$,220$b$ . . . end portions, 221 . . . recessed portion, 222 . . . bottom surface, 228 . . . curved portion, 224 . . . linear portion, 223$a$,223$b$,224$a$,224 . . . end portions, 230 . . . constriction groove, 231 . . . outer groove, 232 inner groove, 241 . . . land portion, 250 . . . air chamber, CT1, CT2 . . . centers, DP1,DP2 . . . depths, G . . . grounding surface, H . . . height, P . . . pitch, Pc . . . center portion, Ps . . . shoulder portion, R1 . . . Helmholtz type resonator (first resonator), R2 . . . Helmholtz type resonator (second resonator), RS . . . road surface, S . . . cross sectional area, W1-W3 . . . width

The invention claimed is:

1. A tire comprising: a plurality of rib-shaped land portions divided by a plurality of circumferential grooves extending along a tire circumferential direction; and a resonator recessed toward the inside in a tire radial direction which forms a predetermined space by the rib-shaped land portion grounded to the road surface, wherein the resonator comprises at least:
a first resonator; and
a second resonator positioned inside the first resonator when installed on a vehicle, the plurality of rib-shaped land portions comprise:
a first rib-shaped land portion provided with a plurality of first resonators; and
a second rib-shaped land portion separated from the first rib-shaped land portion, which is positioned inside the first rib-shaped land portion when installed on a vehicle, and which is provided with a plurality of second resonators, the first resonator and the second resonator each comprise:
an air chamber recessed toward the inside in a tire radial direction; and
a constriction groove communicating to the air chamber and the circumferential groove, wherein the volume of the space formed by the constriction groove and the road surface being smaller than the volume of the space formed by the air chamber and the road surface, one end of the constriction groove communicating to a closed space formed by the air chamber and the road surface along with the other end of the constriction groove communicating to at least one of the circumferential grooves from among a plurality of circumferential grooves, a volume of the air chamber of each first resonator is greater than a volume of the air chamber of each second resonator, in a state where a normal load is applied to the tire, the total volume obtained by totaling the volume of the air chambers of the first resonators positioned within the grounding surface grounding with the road surface is larger than the total volume obtained by totaling the volume of the air chambers of the second resonators positioned within the grounding surface, a width along the tread width direction of the first rib-shaped land portion is wider than a width along the tread width direction of the second rib-shaped land portion, and a plurality of first resonators are provided along the tread width direction in the first rib-shaped land portion, wherein a first group of the plurality of first resonators opens to a circumferential groove on one side of the first rib-shaped land portion, and a second group of the plurality of first resonators opens to a circumferential groove on an opposite side of the first rib-shaped land portion.

2. The tire according to claim 1, wherein the first rib-shaped land portion is provided outside the tire center line when installed on a vehicle, and
the second rib-shaped land portion is provided inside the tire center line when installed on a vehicle.

3. The tire according to claim 1 wherein the number of the second resonators is greater than the number of the first resonators.

4. The tire according to claim 1 wherein the first resonator and the second resonator are Helmholtz type resonators.

* * * * *